US012586925B2

(12) United States Patent
Noghanian

(10) Patent No.: US 12,586,925 B2
(45) Date of Patent: Mar. 24, 2026

(54) ANTENNAS WITH PERIODIC STRUCTURES

(71) Applicant: Ruckus IP Holdings LLC, Claremont, NC (US)

(72) Inventor: Sima Noghanian, San Jose, CA (US)

(73) Assignee: RUCKUS IP HOLDINGS LLC, Horsham, PA (US)

(*) Notice: Subject to any disclaimer, the term of this patent is extended or adjusted under 35 U.S.C. 154(b) by 102 days.

(21) Appl. No.: 18/581,025

(22) Filed: Feb. 19, 2024

(65) Prior Publication Data

US 2024/0332820 A1 Oct. 3, 2024

Related U.S. Application Data

(60) Provisional application No. 63/492,536, filed on Mar. 28, 2023.

(51) Int. Cl.
*H01Q 21/06* (2006.01)
*H01Q 9/04* (2006.01)

(52) U.S. Cl.
CPC .......... *H01Q 21/065* (2013.01); *H01Q 9/045* (2013.01)

(58) Field of Classification Search
CPC ............................ H01Q 21/065; H01Q 9/045
See application file for complete search history.

(56) References Cited

U.S. PATENT DOCUMENTS

| | | | | |
|---|---|---|---|---|
| 2002/0167457 A1* | 11/2002 | McKinzie, III | H01Q 15/0066 | 343/756 |
| 2008/0266179 A1* | 10/2008 | Sotoudeh | H01Q 15/0026 | 343/700 MS |
| 2014/0097995 A1* | 4/2014 | McKinzie, III | H01Q 21/26 | 29/601 |
| 2015/0270622 A1* | 9/2015 | Takasaki | H01Q 15/0013 | 343/837 |

OTHER PUBLICATIONS

Di Renzo, Marco , et al., "Smart radio environments empowered by reconfigurable AI meta-surfaces: an idea whose time has come", EURASIP Journal on Wireless Communications and Networking, 2019, 129, 20 pages.
He , et al., "A Thin Double-Mesh Metamaterial Radome for Wide-Angle and Broadband Applications at Millimeter-Wave Frequencies", IEEE Transactions on Antennas and Propagation, 2020, 68(3):2176-2185.
Jeong, Heijun , et al., "Meta-Dome for Broadband Radar Absorbing Structure", Scientific Reports, 2018, 9 pages.
Ozis, E. , et al., "Metamaterials for Microwave Radomes and the Concept of a Metaradome: Review of the Literature", Hindawi, International Journal of Antennas and Propagation, vol. 2017, Article ID 1356108, 13 pages.

* cited by examiner

*Primary Examiner* — Dieu Hien T Duong
(74) *Attorney, Agent, or Firm* — Myers Bigel, P.A.

(57) ABSTRACT

Antennas with reconfigurable periodic structures are provided. The antenna includes a ground plane, a periodic structure comprising a plurality of conductive patches, and an antenna structure on the periodic structure. Ones of the plurality of conductive patches are selectively electrically connected to adjacent ones, to the ground or not connected to the ground. The antenna structure is configured to resonate at a resonant frequency of the antenna.

18 Claims, 14 Drawing Sheets

ANTENNAS WITH PERIODIC STRUCTURES

BACKGROUND

The present invention generally relates to radio communications and, more particularly, to antennas that have adjustable radiation patterns.

A WLAN refers to a network that operates in a limited area (e.g., within a home, store, campus, etc.) that wirelessly interconnects client devices (e.g., smartphones, computers, printers, etc.) with each other and/or with external networks such as the Internet. Most WLANs operate under the IEEE 802.11 standards, and such WLANs are commonly referred to as Wi-Fi networks. A Wi-Fi network includes one or more radio nodes or "access points" that are installed throughout a coverage area. Each access point comprises one or more radios and associated antennas. Client devices communicate with each other and/or with wired devices that are connected to the Wi-Fi network through the access points.

Early Wi-Fi standards supported communication in the 2.401-2.484 GHz frequency range (herein "the 2.4 GHz frequency band"). Later Wi-Fi standards supported communication in the 5.170-5.835 GHz frequency range (herein "the 5 GHz frequency band"). Most modern access points support communications in both the 2.4 GHz and 5 GHz frequency bands, and have a radio for each frequency band. Recently, the United States Federal Communications Commission voted to open spectrum in the 5.935-7.125 GHz frequency range, which is referred to herein as "the 6 GHz frequency band," for use in Wi-Fi applications, and many other countries are likewise in the process of allowing Wi-Fi networks to operate in the 6 GHz frequency band. Reliable antennas with easy manufacturing methodology for devices that operate in these frequency bands are needed.

SUMMARY

Pursuant to embodiments of the present invention, antennas may include periodic structures that are selectively configured to reduce the vertical height of the antenna.

According to some embodiments, an antenna includes a ground plane, a periodic structure including a plurality of conductive patches, and an antenna structure on the periodic structure. Ones of the plurality of conductive patches are selectively electrically connected to adjacent ones of the plurality of conductive patches. The antenna structure is configured to resonate at a resonant frequency of the antenna.

The antenna may include a plurality of patch selectors coupled to respective ones of the plurality of conductive patches. Ones of the plurality of patch selectors are configured to electrically connect a conductive patch of the plurality of conductive patches to one or more adjacent conductive patches that are adjacent to the conductive patch. The plurality of patch selectors may include pin diodes.

The periodic structure may be separated from the antenna structure by a distance that is substantially less than a quarter wavelength of the resonant frequency of the antenna. The antenna may further include a first dielectric layer between the ground plane and the periodic structure, a second dielectric layer between the periodic structure and the antenna structure, and a first plurality of vias that selectively electrically connect the ground plane to respective ones of the conductive patches.

A direction of a radiation pattern of the antenna may be determined based on selectively electrically connecting adjacent ones of the plurality of conductive patches to one another. The direction of the radiation pattern of the antenna may be further determined based on selectively electrically connecting ones of the conductive patches to the ground plane.

The antenna may further include a signal layer between the ground plane and the periodic structure. A second plurality of vias may electrically connect conductive traces on the signal layer to respective ones of the conductive patches. The conductive traces on the signal layer may form a feed network that is coupled to the antenna structure. The plurality of conductive patches may be arranged in a plane in a grid. Ones of the plurality of conductive patches may be selectively electrically connected to adjacent ones of the plurality of conductive patches in the grid. Ones of the plurality of conductive patches that are on an edge of the grid may be configured to resonate in a first frequency band. The ones of the plurality of conductive patches that are on an inner portion of the grid that is separated from the edge of the grid may be configured to resonate in a second frequency band that is separated from the first frequency band.

The periodic structure may be configured to reflect electromagnetic energy towards the antenna structure. The ground plane, the periodic structure including the plurality of conductive patches, and the antenna structure may be layers of a single printed circuit board (PCB). Ones of the plurality of conductive patches may be selectively electrically connected to the ground plane. The ones of the plurality of conductive patches that are selectively connected to the ground plane determine a direction of radiation from the antenna.

According to some embodiments, an antenna includes a ground plane, and a plurality of conductive patches. A direction of a radiation pattern of the antenna is determined based on selectively electrically connecting ones of the plurality of conductive patches to one another and/or based on selectively electrically connecting ones of the conductive patches to the ground plane.

The antenna may further include a dipole antenna structure on the plurality of conductive patches. The dipole antenna structure is configured to resonate at a resonant frequency of the antenna. The plurality of conductive patches may be separated from the dipole antenna structure by a distance that is substantially less than a quarter wavelength of the resonant frequency of the antenna. The ground plane, the plurality of conductive patches, and the dipole antenna structure may be layers of a single printed circuit board (PCB). Ones of the plurality of conductive patches are selectively electrically connected to adjacent ones of the plurality of conductive patches. The antenna may further include a plurality of vias that selectively electrically connect the ground plane to respective ones of the conductive patches.

According to some embodiments, an antenna includes a ground plane, a plurality of conductive patches, and a dipole antenna structure overlapping some of the plurality of conductive patches. The plurality of conductive patches are separated from the dipole antenna structure by a distance that is substantially less than a quarter wavelength of a resonant frequency of the antenna.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Horizontally polarized antennas (i.e., an antenna that is configured to transmit and receive horizontally polarized RF radiation) are used in applications such as Wi-Fi applications for access points. However, horizontally polarized antennas may include a dipole that is mounted above or below a Printed Circuit Board (PCB), such as a main PCB of the access point, separated by an airgap that may be 20 mm or more. The separated dipole antenna may be difficult to manufacture and assemble. Additionally, a feed transmission line may need to be run from the PCB up a stalk structure to the dipole. Various embodiments described herein arise from the recognition that a separated dipole is not desirable for many reasons, such as noise issues on the feed transmission line, dipole component alignment to the main PCB, etc. Reducing a spacing between the dipole and the PCB provides advantages such as ease of manufacturing, a simplified antenna feeding structure, and reduced cost associated with components and manufacturing. The improved antenna design is accomplished using a periodic structure such as an Artificial Magnetic Conductor (AMC) structure that includes a periodic pattern of small metal patches that are formed on one or more dielectric substrates. The dipole of the antenna may be integrated into a single PCB substrate along with the periodic structure to produce an antenna suitable for Wi-Fi applications.

Figure 1:
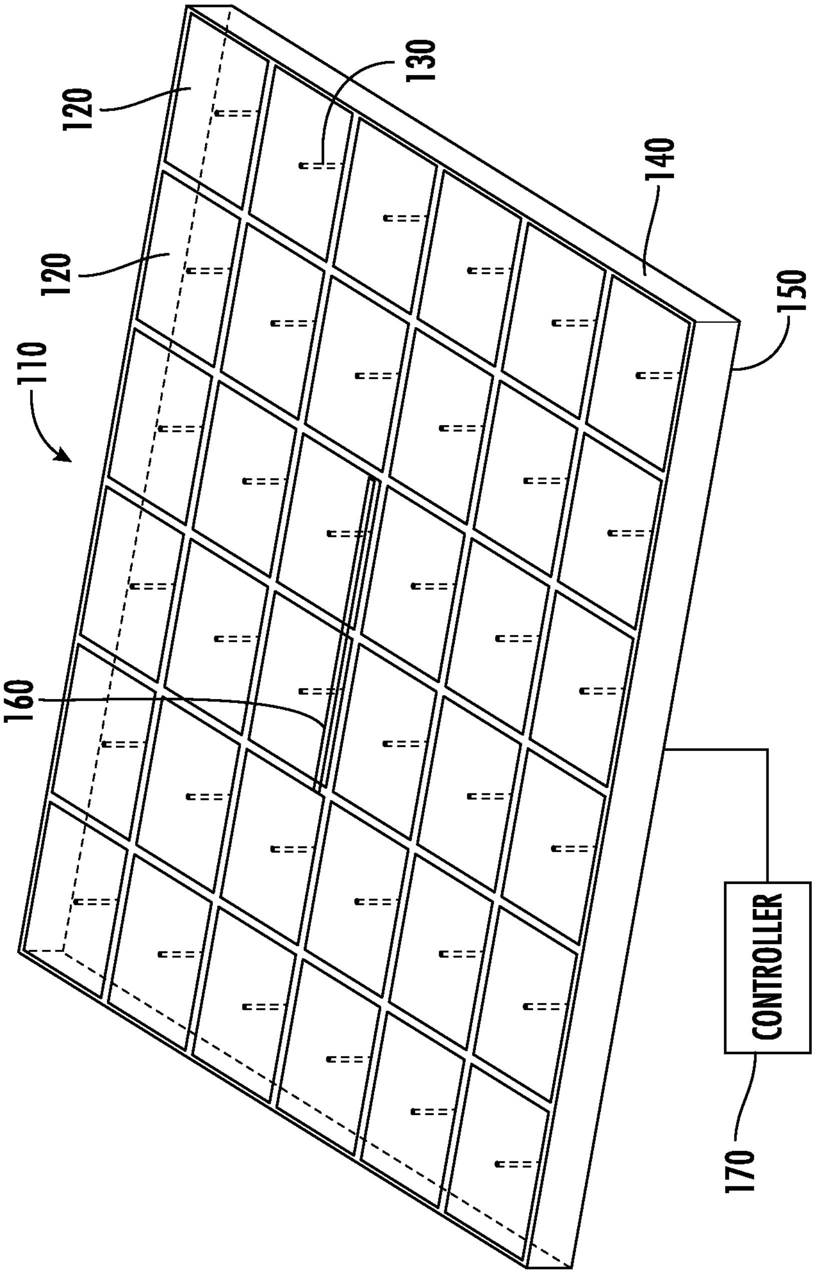
FIG. 1 is a periodic structure that is used in an antenna, according to various embodiments.

FIG. 1 illustrates a periodic structure that is used in an antenna. Referring to FIG. 1, the antenna includes a dipole 160 that radiates at a resonant frequency of the antenna, a periodic structure 110, a dielectric substrate 140, and a ground plane 150. Although a dipole antenna structure is used as an example, other antenna structures such as microstrip patch antennas may be used. The periodic structure 110, which is formed on a first side of the dielectric substrate 140, includes a grid or array of patches 120 that extend in the x-direction and the y-direction that are parallel to the ground plane 150. The ground plane may be a metal sheet that is coupled to a reference voltage source such as a ground voltage. Each of the array of patches 120 may be electrically shorted to ground plane 150 such that the antenna has a configurable radiation pattern. The dipole 160, periodic structure 110, dielectric substrate 140, and the ground plane 150 may be stacked in a z-direction that is perpendicular to the ground plane 150. These elements may be implemented in various layers of a PCB. A controller 170 may be external to the antenna and control one or more circuits or switches that selectively electrically connect adjacent patches 120 to one another or one or more switches that electrically connect respective patches 120 to the ground plane 150. A circuit such as a switch or patch selector may selectively electrically connect adjacent patches 120 to one another. The patch selector may be implemented using a pin diode. A pin diode is a diode with a wide, undoped intrinsic semiconductor region between a p-type semiconductor and an n-type semiconductor region. The p-type and n-type regions of a pin diode are typically heavily doped. Selectively electrically connecting various patches 120 together provides control of the electromagnetic radiation pattern and/or beam direction of the antenna. Vias 130 may connect each patch 120 to the ground plane 150. These vias 130 may be metal-plated or metal-filled and individually selected to be open circuited or short circuited to the ground plane 150. The selective opening or shorting of vias 130 may also be used to control the electromagnetic radiation pattern and/or beam direction of the antenna, as will further be discussed with respect to embodiments related to FIG. 8. In some embodiments, the pin diode of the patch selector may be used to electrically connect a patch 120 to a neighboring patch 120. Vias 130 may be implemented as plated through-holes that extend through the dielectric substrate 140. Although the dipole of FIG. 1 is illustrated as a two-segment dipole that resonates in a single frequency band, different types of dipoles may be used in various embodiments described herein, such as those in example embodiments related to FIG. 11A and/or FIG. 11B. Dielectric substrate 140 may include an Artificial Magnetic Conductor (AMC) structure. The AMC structure mimics the behavior of Perfect Magnetic Conductor (PMC) which is not available in nature.

Figure 2A:
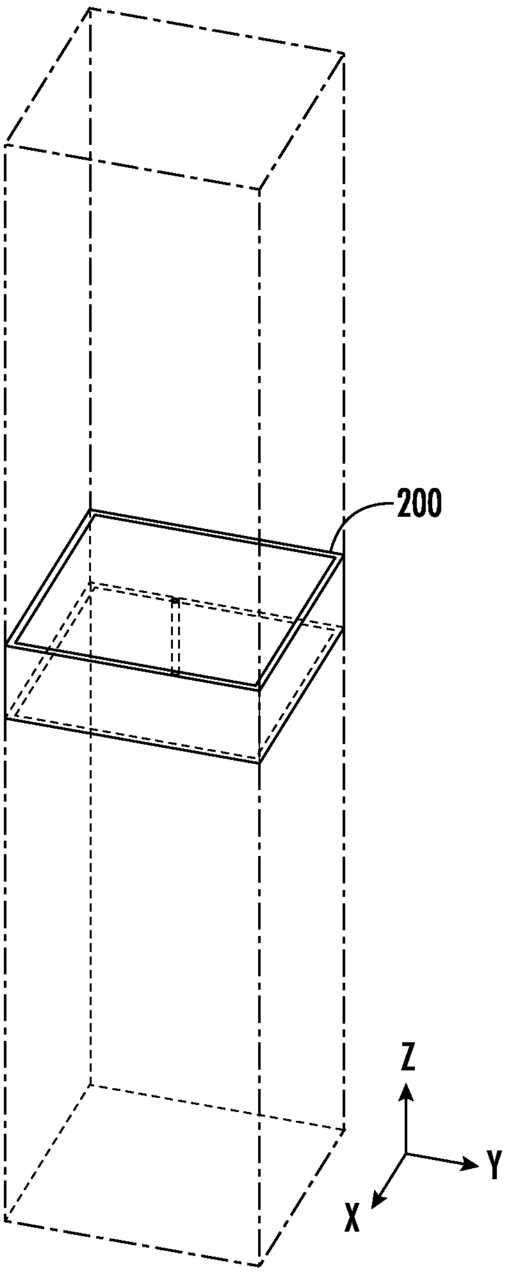
FIGS. 2A, 2B, and 2C illustrate a unit cell of a periodic structure that is used in an antenna, according to various embodiments.
Figure 2B:
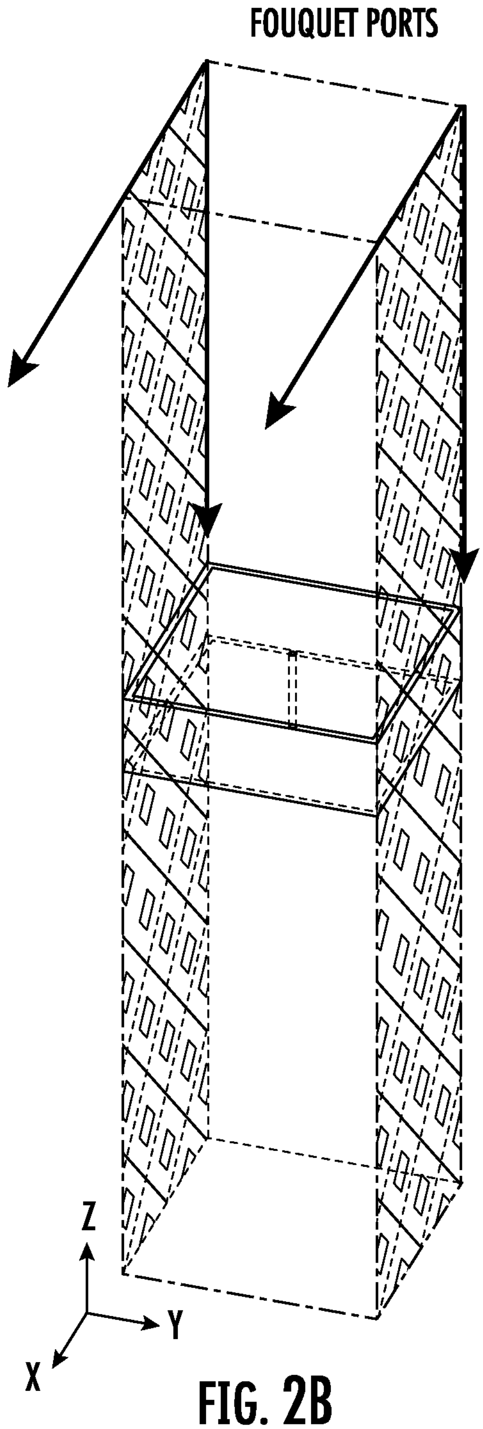
Figure 2C:
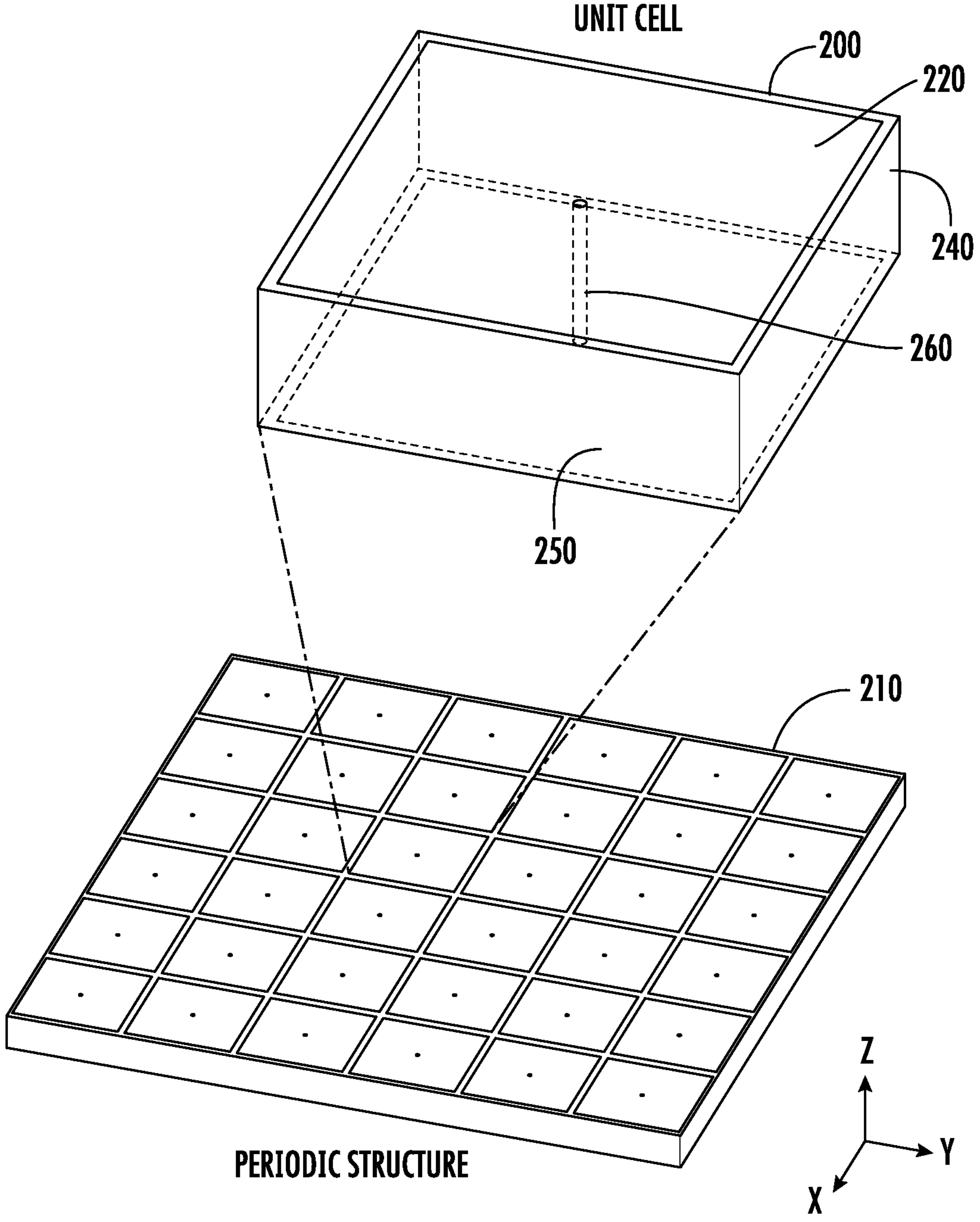

FIGS. 2A, 2B, and 2C illustrate a unit cell of a periodic structure 210 that is used in the antennas described herein (e.g. the periodic structure 110). Referring to FIGS. 2A, 2B, and 2C, the periodic structure 210 includes a plurality of unit cells such as unit cell 200. The unit cell 200 may include a conductive layer such as a patch 220 and a ground plane 250 with an insulator such as dielectric layer 240 therebetween. A conductive via 260 may extend between patch 220 and ground plane 250. In some embodiments a pin diode may be included in the unit cell 200 to selectively short the via 260 to the ground plane 250. For example, the ground plane 250 may include an opening (non-metallized) around each via 260, and a pin diode may extend across the opening to selectively electrically connect the conductive via 260 to the ground plane 250.

Figure 3:
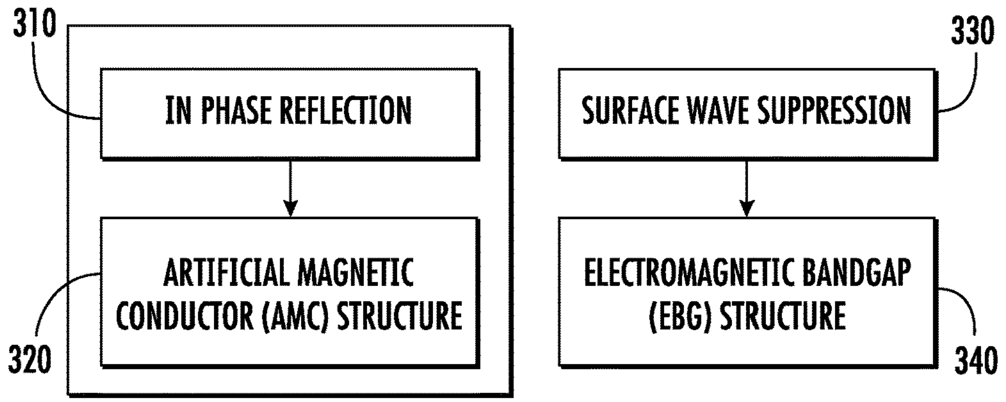
FIG. 3 describes operation of periodic structures in antennas, according to various embodiments.

FIG. 3 describes operation of the periodic structures in the antennas described herein. Referring to FIG. 3, periodic structures may control the propagation of electromagnetic waves in the antenna. A periodic structure may provide in phase reflection of RF radiation emitted by the antenna, at block 310 such that the RF radiation is additive. An AMC structure may be used to achieve this in-phase reflection, at block 320. According to some embodiments, the periodic structures may suppress surface waves on the antenna, at block 330. Furthermore, the periodic structures may be an Electromagnetic band-gap (EBG) structure with a periodic pattern of small metal patches on dielectric substrates, at block 340. The EBG structure may be implemented in the same layer as the dipole radiators or in a layer that is physically very close to the dipole radiators.

Figure 4:
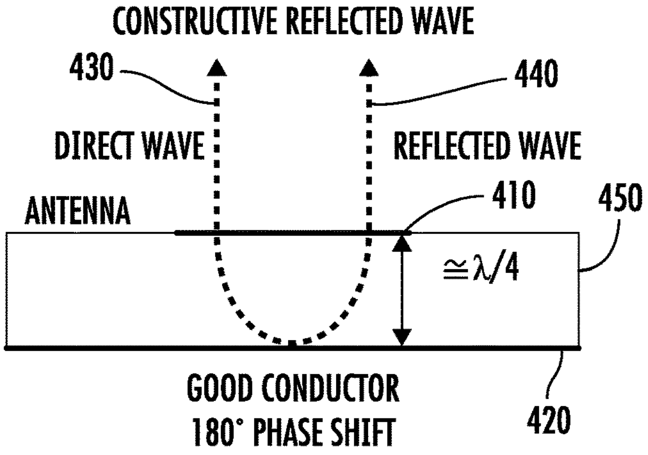
FIG. 4 and FIG. 5 illustrate a ground effect for a good conductor and a reduction in the antenna height by usage of a periodic structure, according to various embodiments.

FIG. 4 illustrates an antenna design that produces a constructive reflected wave. Referring to FIG. 4, PCB 420 includes a dielectric layer and a ground plane. A dielectric substrate 450 may be between antenna resonator 410 and PCB 420. Antenna resonator 410 (e.g., a dipole) may be spaced about a quarter of the wavelength of the resonant frequency (λ/4) of the antenna from the ground layer of the PCB 420. RF radiation emitted downwardly by antenna resonator 410 undergoes a 90° phase change as it travels 24 to the ground plane of the PCB 420, undergoes another 180° phase shift as it reflects from the ground plan, and undergoes another 90° phase change as it travels upwardly to the antenna resonator 410. Thus, downwardly emitted RF energy will undergo a 360° phase change as it travels to the ground plane and then travels back to the antenna resonator 410. As such, the reflected downwardly emitted RF radiation will be in-phase with the upwardly directed RF radiation emitted by antenna resonator 410. Thus the downwardly emitted and upwardly emitted RF radiation constructively combine. However, the λ/4 spacing of the antenna resonators 410 from the ground plane of the PCB 420 may not be desirable, since for the Wi-Fi frequency band applications, this may entail a spacing of 20 mm or more.

Figure 5:
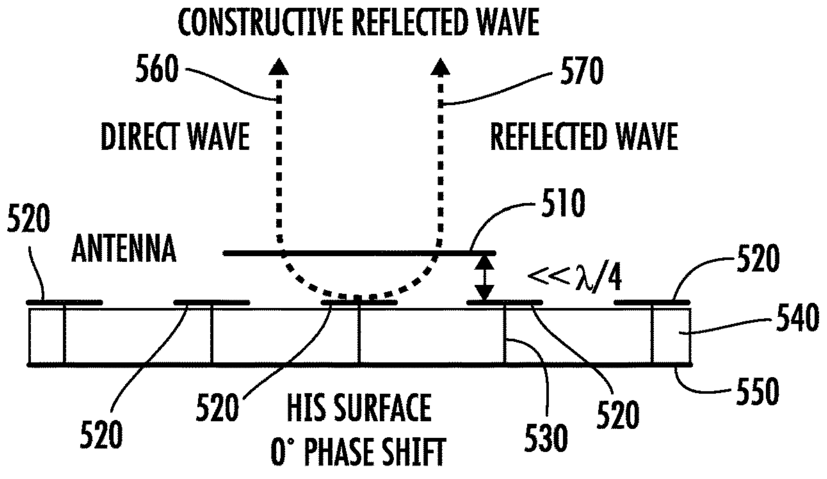

FIG. 5 illustrates another antenna design that also produces a constructive reflected wave. Referring to FIG. 5, antenna resonators 510, such as dipoles, may be integrated into a single PCB (e.g., on an additional metal layer of the PCB) with other elements such as a periodic structure with patches 520, which corresponds to the periodic structure 110 of FIG. 1 and/or the periodic structure 210 of FIGS. 2A, 2B, and 2C.

Still referring to FIG. 5, the antenna resonators 510 may be spaced substantially closer to the periodic structure with patches 520 than in FIG. 4, i.e., with a spacing substantially less than λ/4 of the resonant frequency of the antenna. This reduced spacing may be achieved by integrating the antenna resonators 510 into a PCB substrate with other components. The dielectric substrate 540 of the PCB may be, for example, FR4 or other dielectric materials. The patches 520 may be selectively connected to the ground plane 550 through vias 530. A dielectric substrate 540 may be between the patches 520 and the ground plane 550. Based on the selective configuration of the patches 520, a 180° phase shift occurs in the reflected wave 570 (e.g., the downwardly emitted RF radiation that is reflected upwardly) such that it is added constructively to the direct wave 560 and radiated in a direction that may be perpendicular to the PCB. Patches 520 are selectively configured to influence the electromagnetic radiation pattern and/or beam direction of the antenna.

Figure 6A:
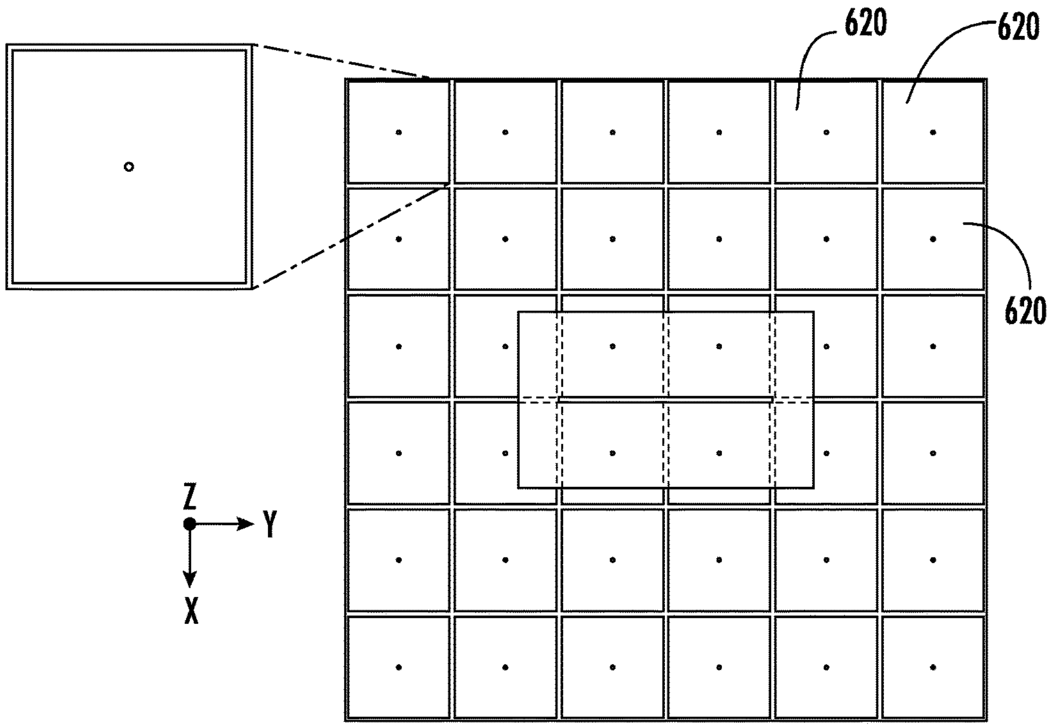
FIGS. 6A, 6B, 6C, and 7 illustrate a periodic structure that is used in an antenna, according to various embodiments.
Figure 6B:
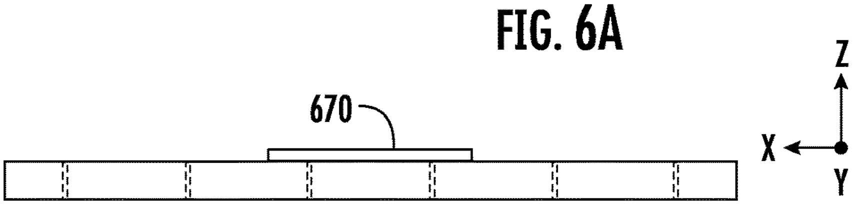
Figure 6C:
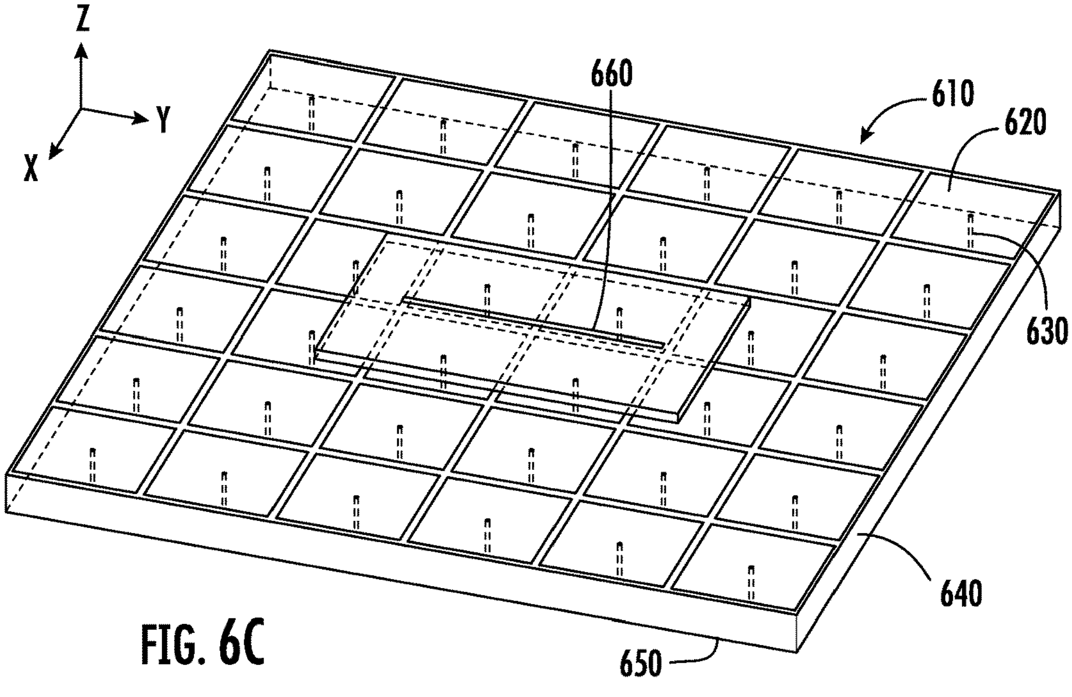

FIGS. 6A, 6B, and 6C illustrate a periodic structure that is used in the antennas described herein. Referring to FIGS. 6A, 6B, and 6C, an example of a 2.45 GHz dipole 660 on a periodic structure, similar to that of FIG. 5 is provided. The dipole 660 may be implemented on a first PCB that has a height of 0.1578 mm. The first PCB may be mounted directly on a second PCB that includes the periodic structure 610. In some embodiments, a single PCB may be used that includes an extra metal layer in which the dipole 660 is implemented. The thickness of the second PCB may be 5.8 mm. The periodic structure 610 may be an array or grid of patches 620 that are arranged in an N×N array, such as a 6×6 array. In the non-limiting example, the 6×6 array of the periodic structure 610 may have six patches 620 in a row that has a length of 54.3 mm. Each patch 620 may have a width of 18.1 mm. Various patches 620 may be electrically or selectively electrically connected to adjacent patches 620 and/or have vias 630 that may be shorted to ground 650 or opened, in order to provide beam shaping and/or control the beam direction. The 6×6 array of the periodic structure 610 is discussed herein as an example, but smaller arrays such as a 2×2 array may be used, although they may do not provide as much flexibility for radiation pattern shaping.

Figure 7:
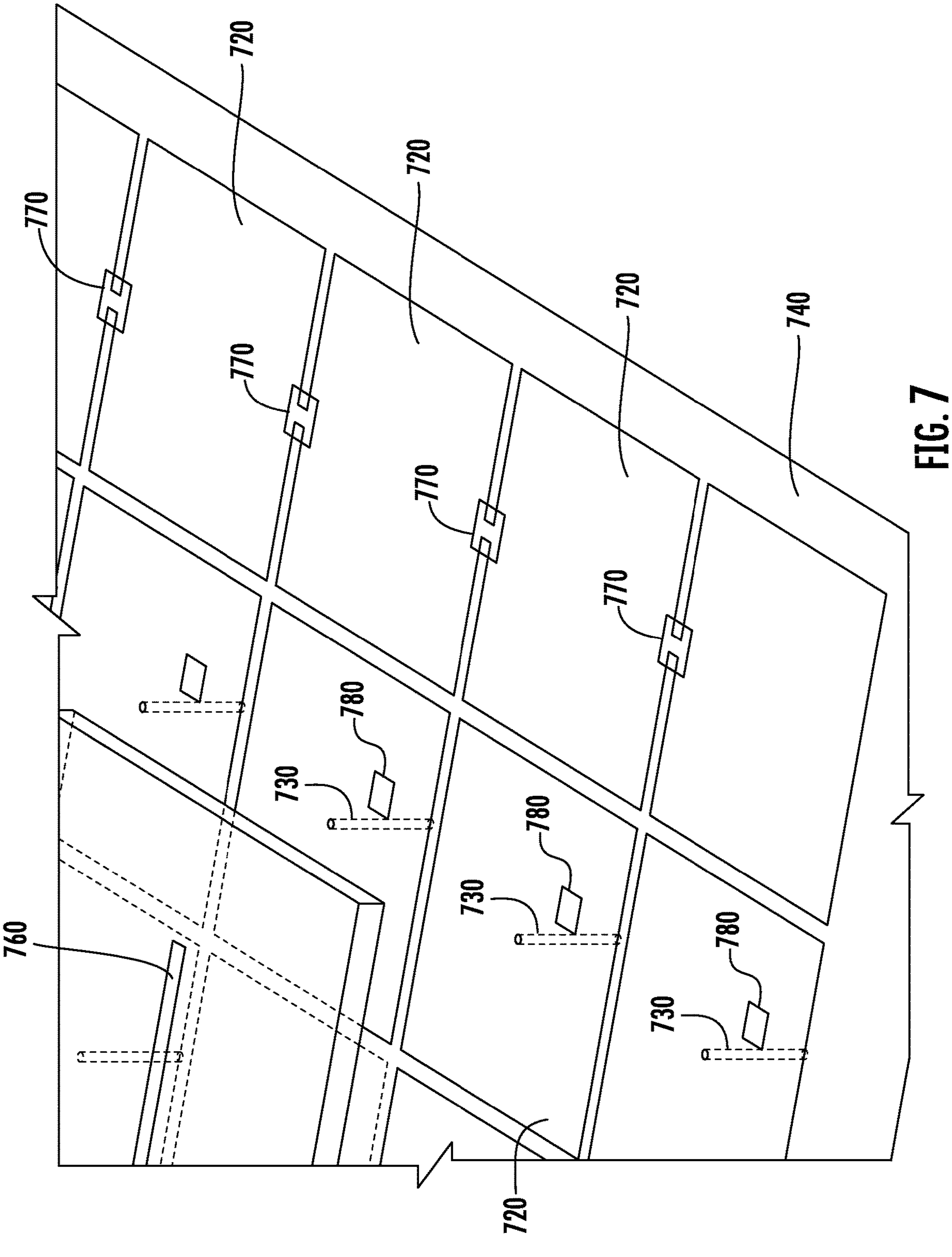

FIG. 7 illustrates a periodic structure that is used in the antennas described herein. Referring to FIG. 7, a dielectric layer 740 may have patches 720 on a top surface. Some of the patches 720 may be physically shorted together by a switch 770 that controls the connection of the patches 720 to each other. Specifically, a switch 770 may electrically connect a patch 720 to an adjacent patch 720. Another layer on the PCB or a separate PCB may include an antenna such as dipole 760. Vias 730 may extend between patches 720 to the ground plane. Patches 720 may be selectively electrically connected to one another using a patch selector element or a switch 770 such as a pin diode. In some embodiments, a switch may electrically connect patch 720 to via 730 such that patch 720 is electrically connected to the ground plane.

FIGS. 8A, 8B, 8C, and 8D illustrate RF radiation patterns for different configurations of antennas, according to various embodiments. Referring to FIGS. 8A, 8B, 8C, and 8D, in these non-limiting examples for a 2.45 GHz band horizontal polarized dipole antenna, each patch of the array of patches of the antenna may be electrically shorted to ground or electrically connected to the adjacent patch, such that the antenna has a configurable radiation pattern.

Figure 8A:
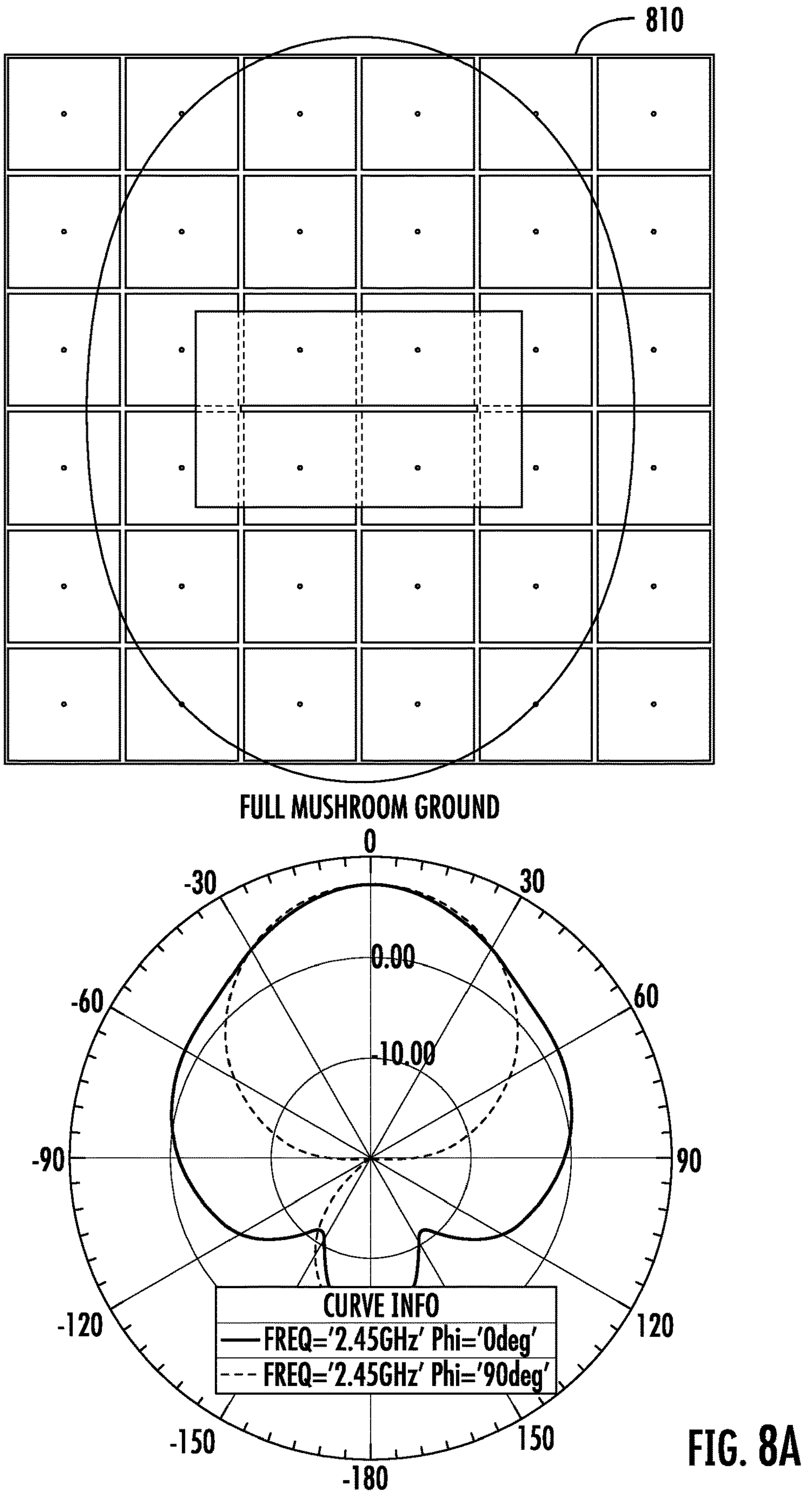
FIGS. 8A, 8B, 8C, and 8D illustrate RF radiation patterns of antennas, according to various embodiments.

Referring to FIG. 8A, in the example configuration of the periodic structure 810, each of the patches in the 6×6 array is shorted to ground through the vias in each patch. None of the patches are connected to each other. This produces a broadside radiation pattern that extends in the z-direction and extends roughly equally in both directions along the x-axis and the y-axis.

Figure 8B:
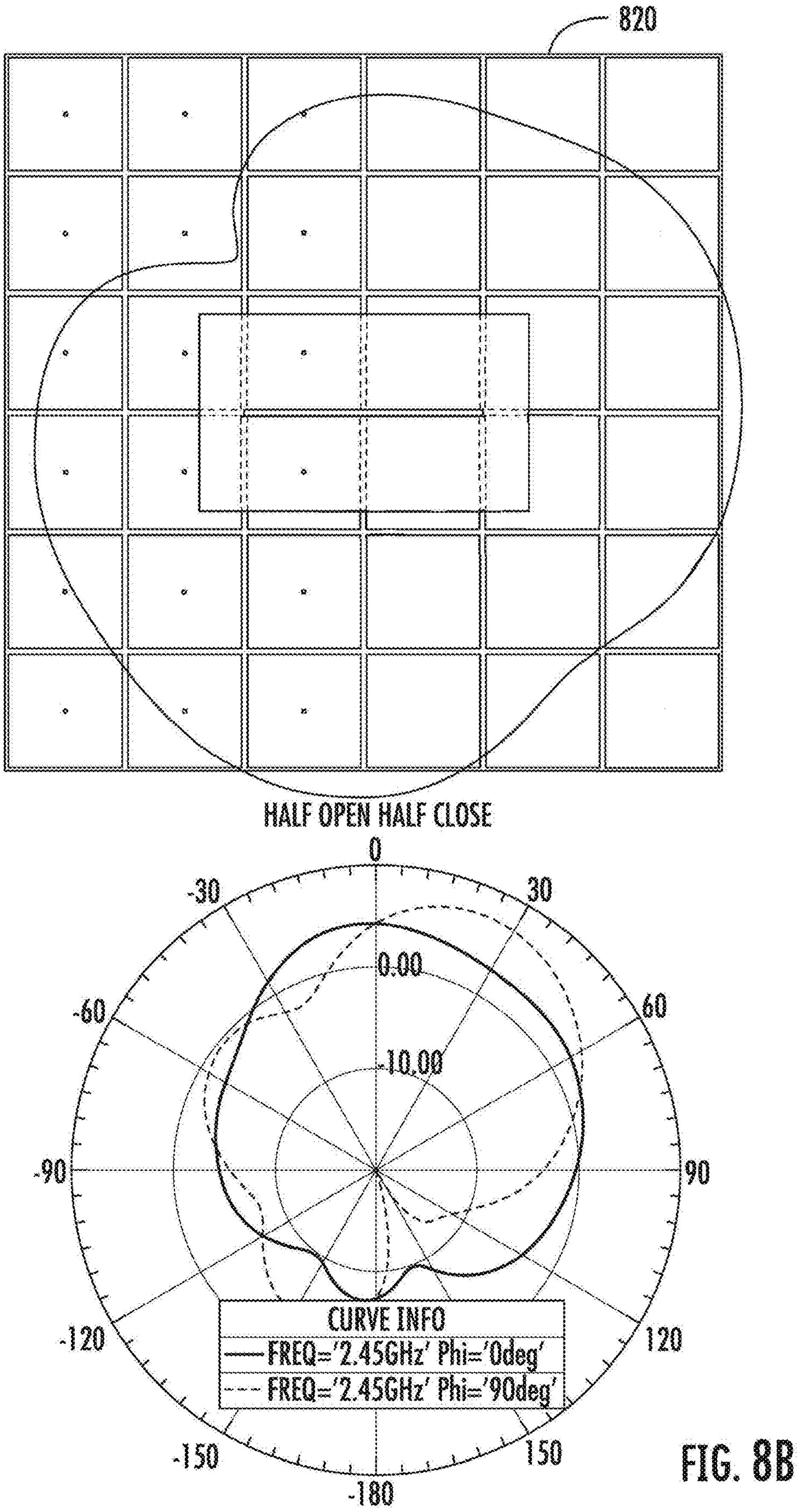

Referring to FIG. 8B, the example configuration of the periodic structure 820 includes a half open/half closed configuration where the patches in the first three columns (i.e., left columns) are shorted to ground, whereas the last three columns of patches (i.e., right columns) are open circuited (i.e., not shorted to ground). The resulting radiation pattern is strongest to one side at around 30°.

Figure 8C:
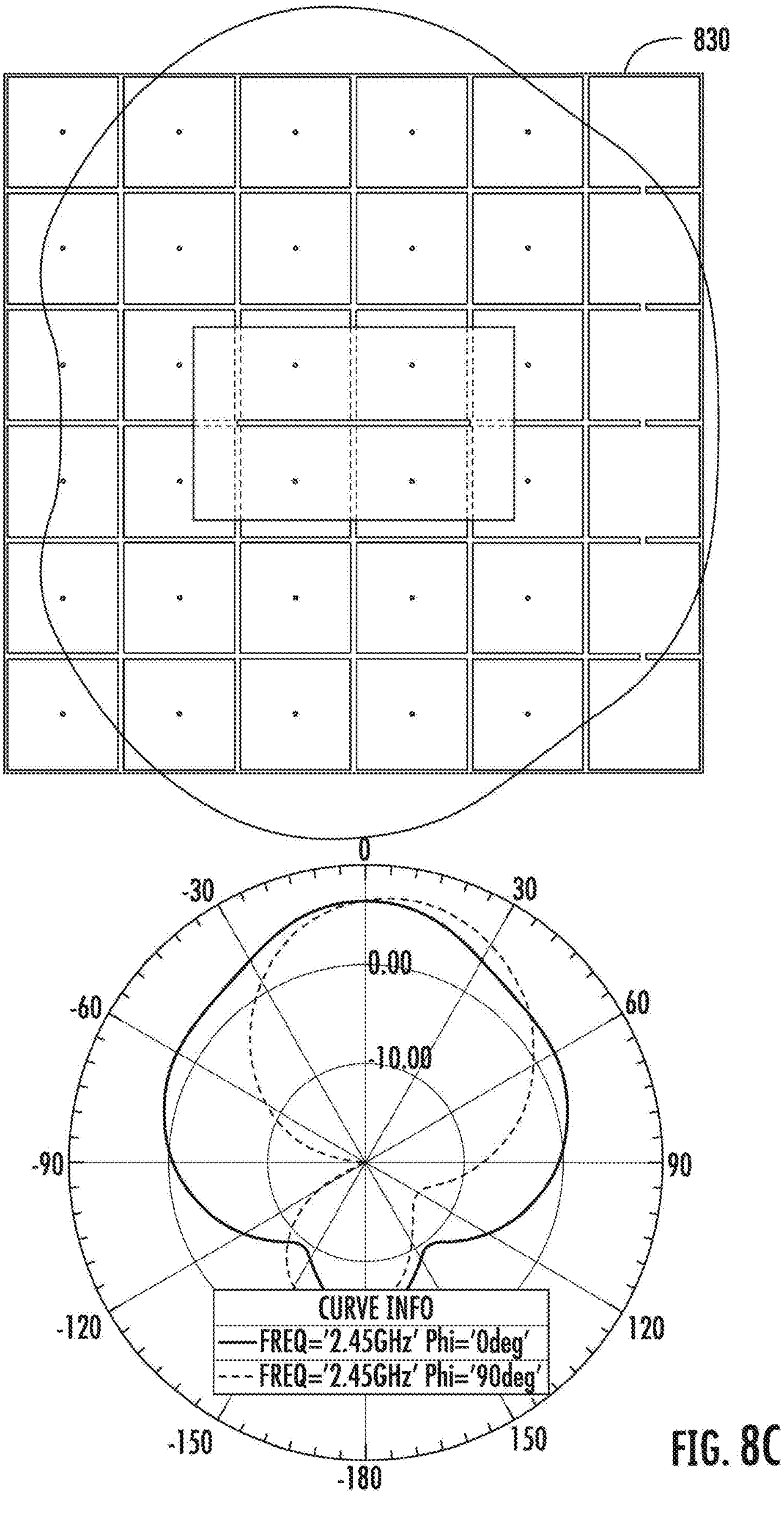

Referring to FIG. 8C, the example configuration of the periodic structure 830 includes a mushroom ground with one strip connected approach where one column of patches on the right side of the periodic structure 830 are connected to another. The mushroom ground produces a broadside RF radiation pattern that is pushed toward the direction of connected patches. Patches in the first five columns (i.e., 5×6 array) are shorted to ground, as seen by the vias in each of these patches. This produces a radiation pattern that is directed to the right side of the periodic structure 830.

Figure 8D:
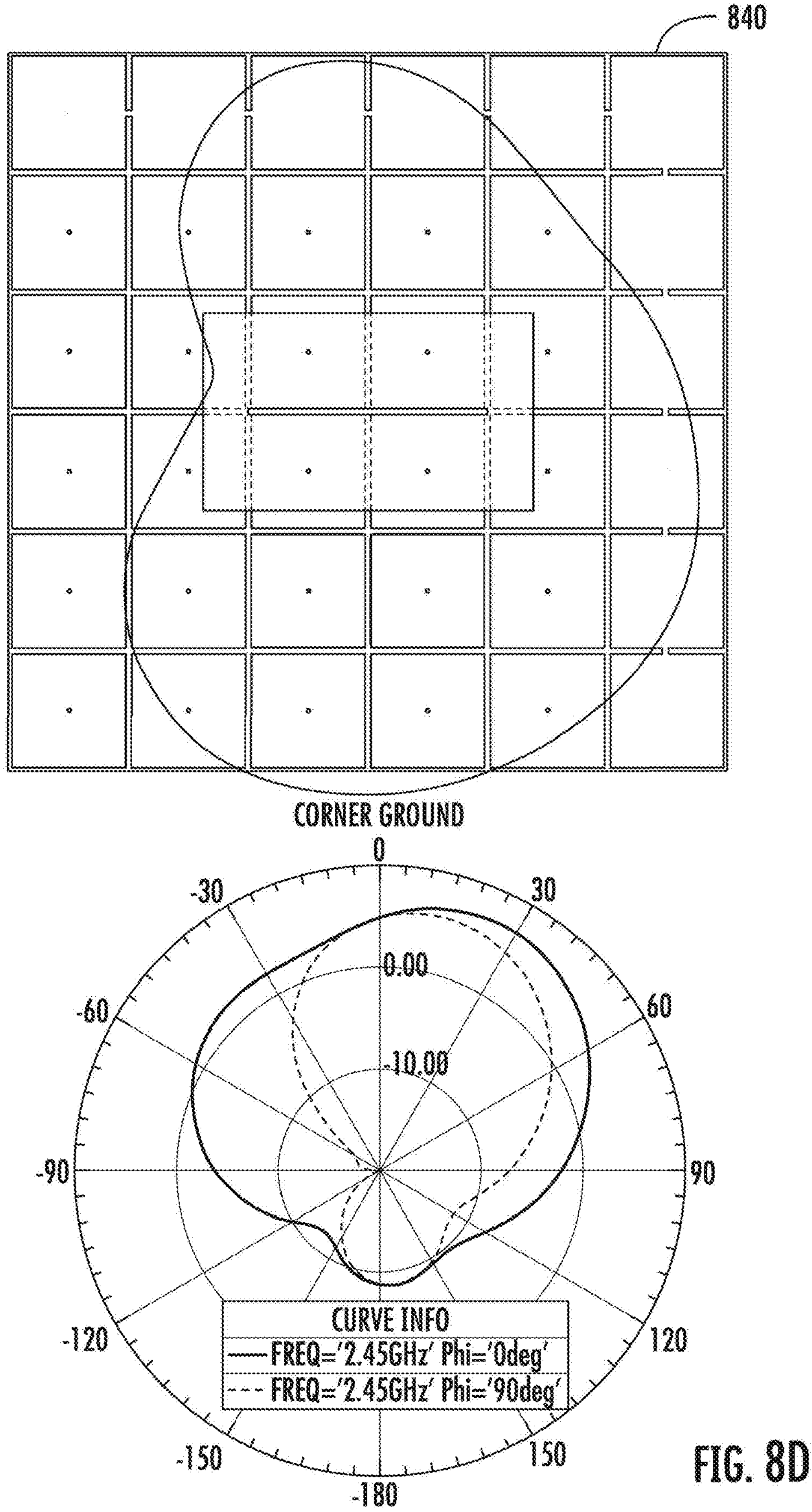

Referring to FIG. 8D, the example configuration of the periodic structure 840 includes patches in a 5×5 array portion of the lower corner of the periodic structure 840 are shorted to ground, as seen by the vias in each of these patches. The patches in the top row and the rightmost column are shorted together. This corner-ground configuration produces a radiation pattern that is directed towards a lower right direction with respect to the periodic structure 840.

Figure 9A:
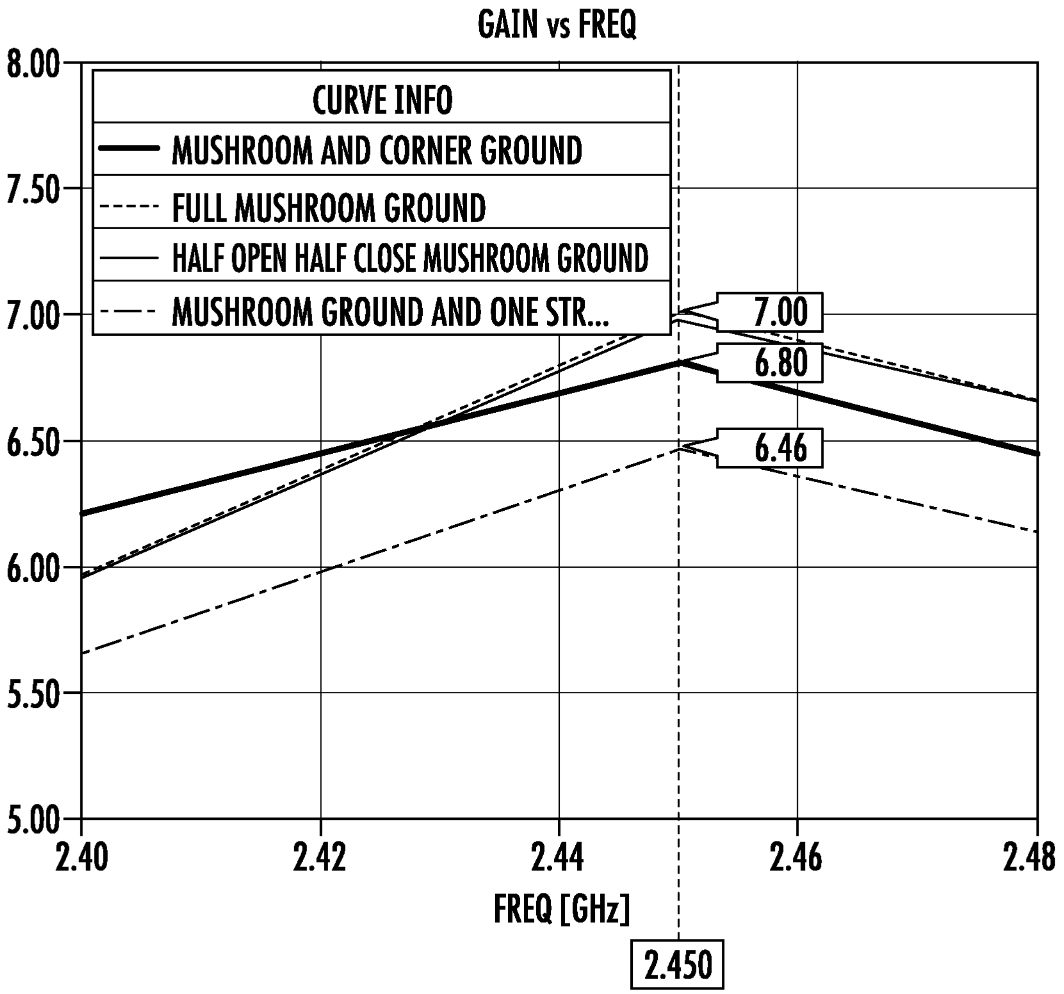
FIGS. 9A and 9B include graphs that illustrate the gain and impedance matching frequency responses of various antennas of FIGS. 8A, 8B, 8C, and 8D, according to various embodiments.
Figure 9B:
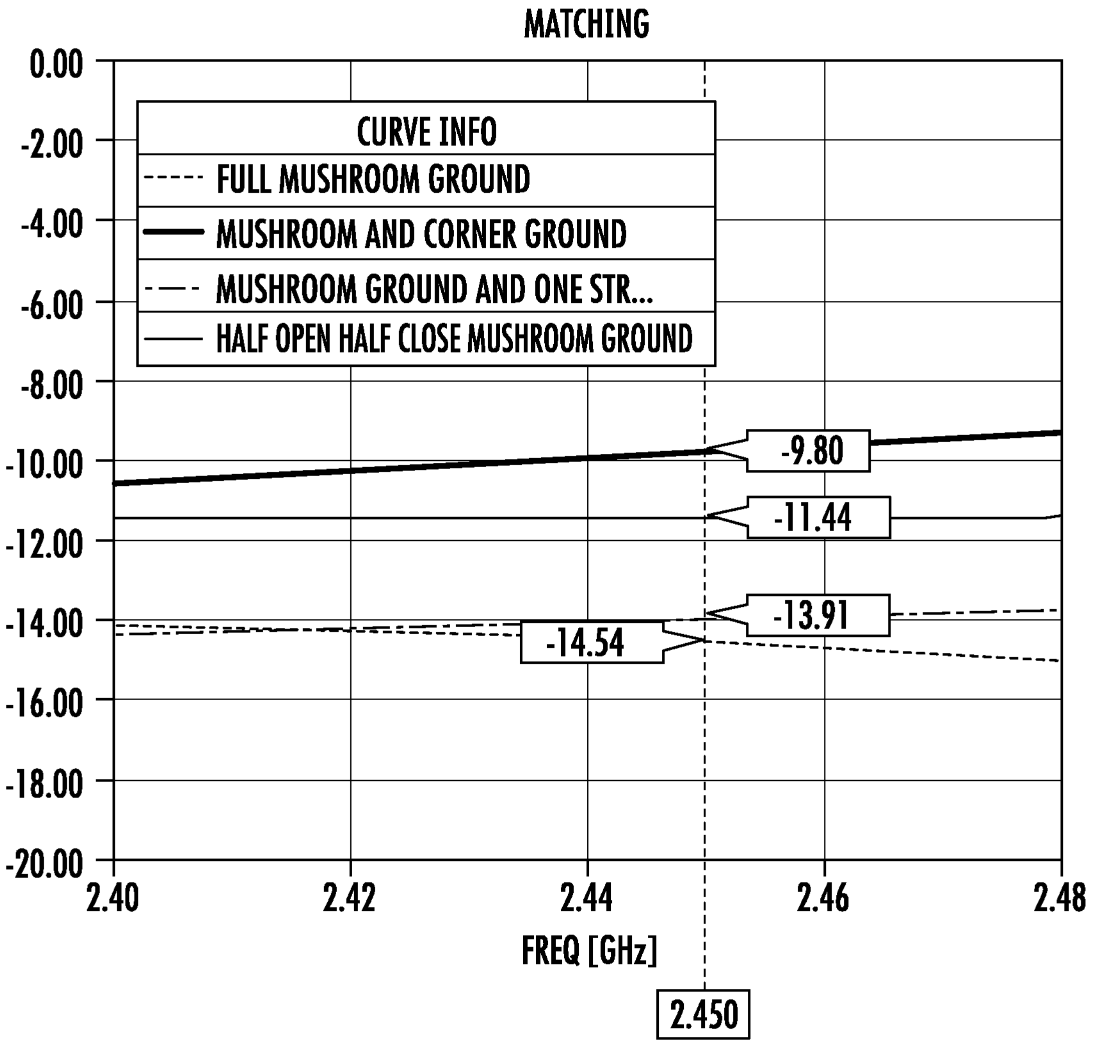

FIGS. 9A and 9B include graphs that illustrate the gain and reflection coefficient of the antennas of FIGS. 8A, 8B, 8C, and 8D. Referring to FIGS. 9A and 9B, graphs for antennas operating in the 2.45 GHz frequency band are shown. As seen in the graph illustrating the gain vs. frequency for antennas using the periodic structures 810, 820, 830, and 840 of FIGS. 8A, 8B, 8C, and 8D, the gain of each of the respective antenna is not substantially affected by the various configurations of selectively grounding the patches and/or selectively joining patches in a row or column of the N×N array. Furthermore, the losses in the 2.45 GHz band for the periodic structures 810, 820, 830, and 840 show reasonable performance of these antennas, with slightly better performance of the full mushroom ground periodic structures 810 of FIG. 8A and mushroom ground that produces a broadside radiation pattern with one strip periodic structure 830 of FIG. 8C. As shown in the return loss graph, return losses of less than-9.80 dB are achieved for all configurations.

Figure 10:
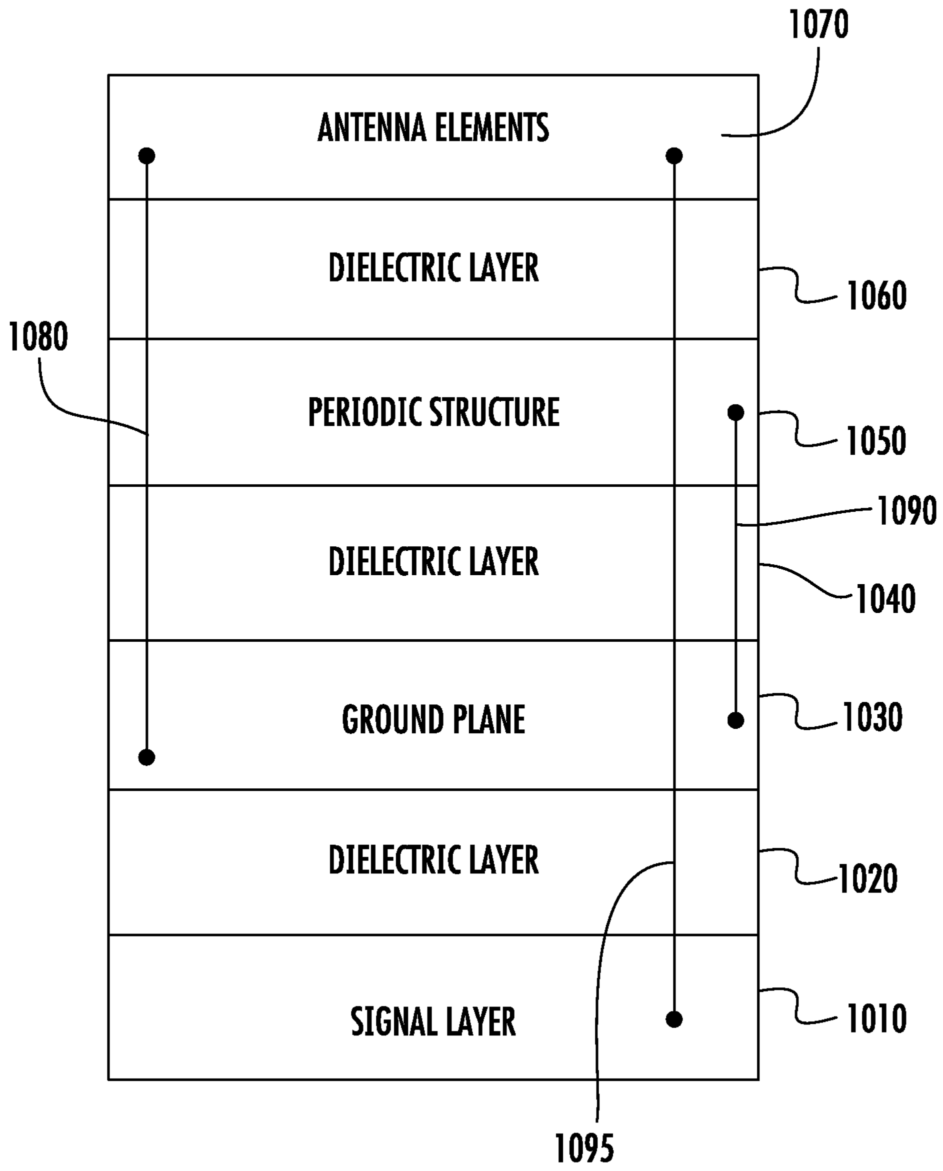
FIG. 10 illustrates a side view of an antenna, according to various embodiments.

FIG. 10 illustrates a side view of an antenna, according to various embodiments in which the antenna is implemented in a single multilayer PCB. Referring to FIG. 10, a side view of the PCB is shown. Antenna 1000 may include a ground plane 1030, a first dielectric layer 1020, a signal layer 1010, a second dielectric layer 1040, a periodic structure 1050, a third dielectric layer 1060, and antenna elements 1070. Via 1095 may extend from the antenna elements 1070 to signal layer 1010. Via 1095 may be a feedline that is used to excite the antenna elements 1070 to resonate at a resonant frequency of the antenna. Via 1090 may extend from the periodic structure 1050 to the ground plane 1030, to electrically connect a patch of the periodic structure 1050 to the ground plane 1030. Although a single via 1090 is shown in FIG. 10 as an example, each patch of the periodic structure 1050 may have a respective via that selectively electrically connects to the ground plane 1010. If the antenna is a dipole antenna, as a non-limiting example, via 1080 may extend from the dipole antenna elements 1070 to the ground plane 1030. In other words, if the antenna is a dipole antenna, one side of the dipole antenna element 1070 is connected to the ground plane 1030 and one side of the dipole antenna element 1070 is connected to the signal layer 1010. However, for some types of antennas, such as a microstrip antenna, via 1080 may not be needed.

Figure 11A:
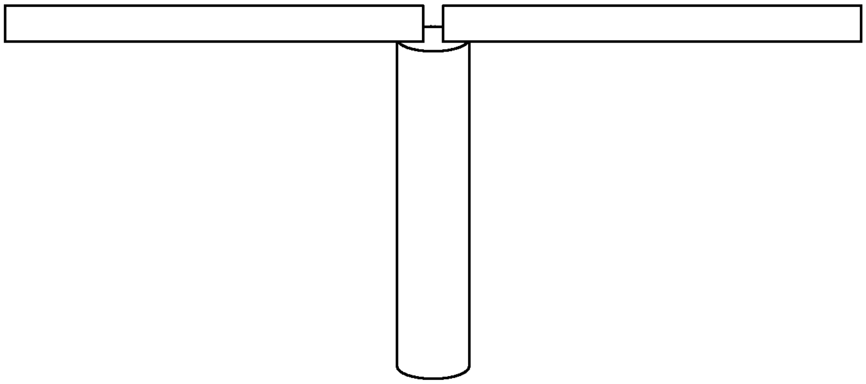
FIG. 11A and FIG. 11B include example dipoles that may be used in an antenna, according to various embodiments.
Figure 11B:
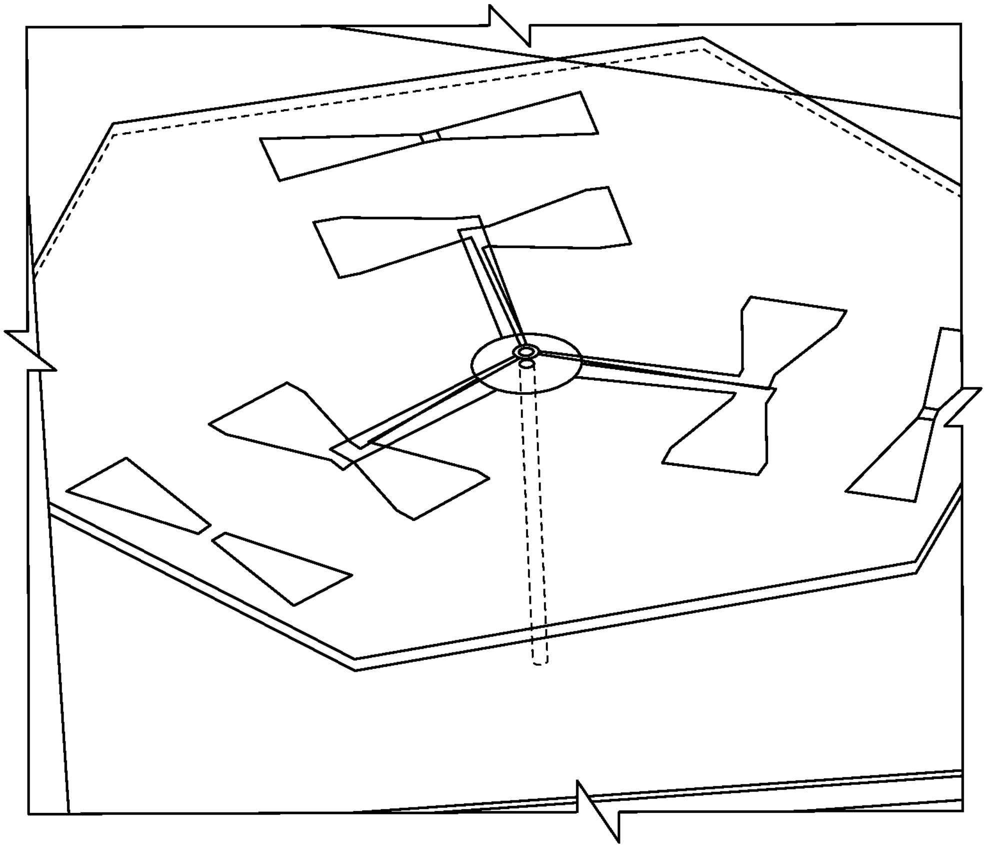

FIG. 11A and FIG. 11B include example dipoles that may be used in an antenna, according to various embodiments. FIG. 11A illustrates a single dipole that includes a pair of dipole arms. FIG. 11B illustrates a multi-dipole case (here three dipoles are arranged in an Alford loop) with reflectors to direct radiation pattern.

It will be appreciated that many modifications may be made to the antennas described above without departing from the scope of the present invention. For example, the antennas can have more or fewer columns of radiating elements, and can include more or fewer radiating elements in each column. The antennas can be designed to cover different sized coverage areas in the azimuth plane. For example, in some embodiments, the antennas may be designed to cover 120° sectors in the azimuth plane when operating as a sector antenna.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An antenna, comprising:

a ground plane in a first layer of a printed circuit board;

a periodic structure comprising a plurality of conductive patches in a second layer of the printed circuit board; and an antenna structure in a third layer of the printed circuit board that is on the second layer of the printed circuit board comprising the periodic structure, wherein ones of the plurality of conductive patches are selectively electrically connected to adjacent ones of the plurality of conductive patches or to the ground plane, wherein the antenna structure is configured to resonate at a resonant frequency of the antenna, and wherein a direction of a radiation pattern of the antenna is determined based on selectively electrically connecting ones of the plurality of conductive patches to the ground plane or to the adjacent ones of the plurality of conductive patches in the second layer of the printed circuit board.

2. The antenna of claim 1, further comprising:

a switch configured to selectively electrically connect or electrically disconnect ones of the ones of the plurality of conductive patches of the periodic structure to the ground plane or to each other.

3. The antenna of claim 1, further comprising:

a plurality of patch selectors coupled to respective ones of the plurality of conductive patches, wherein ones of the plurality of patch selectors are configured to electrically connect a conductive patch of the plurality of conductive patches to one or more adjacent conductive patches that are adjacent to the conductive patch, or to the ground plane.

4. The antenna of claim 3, wherein the plurality of patch selectors comprises pin diodes.

5. The antenna of claim 1, wherein the periodic structure is separated from the antenna structure by a distance that is substantially less than a quarter wavelength of the resonant frequency of the antenna.

6. The antenna of claim 1, further comprising:

a first plurality of vias that selectively electrically connect the ground plane to respective ones of the plurality of conductive patches.

7. The antenna of claim 1, further comprising:

a signal layer between the ground plane and the periodic structure, wherein the signal layer is separated from the ground plane by a dielectric layer.

8. The antenna of claim 1, wherein the plurality of conductive patches are arranged in a plane in a grid, and wherein the ones of the plurality of conductive patches are selectively electrically connected to the adjacent ones of the plurality of conductive patches in the grid.

9. The antenna of claim 1, wherein the periodic structure is configured to reflect electromagnetic energy towards the antenna structure.

10. The antenna of claim 1, wherein the ones of the plurality of conductive patches that are selectively connected to the ground plane determine a direction of radiation from the antenna.

11. An antenna, comprising:

a ground plane in a first layer of a printed circuit board; and a plurality of conductive patches in a second layer of the printed circuit board, wherein a direction of a radiation pattern of the antenna is determined based on selectively electrically connecting ones of the plurality of conductive patches in the second layer of the printed circuit board to one another and/or based on selectively electrically connecting the ones of the plurality of conductive patches in the second layer of the printed circuit board to the ground plane, wherein the ones of the plurality of conductive patches in the second layer of the printed circuit board are selectively electrically connected to adjacent ones of the plurality of conductive patches in the second layer of the printed circuit board.

12. The antenna of claim 11, further comprising:

an antenna structure on the plurality of conductive patches, wherein the antenna structure is configured to resonate at a resonant frequency of the antenna.

13. The antenna of claim 12, wherein the plurality of conductive patches are separated from the antenna structure by a distance that is substantially less than a quarter wavelength of the resonant frequency of the antenna.

14. The antenna of claim 11, further comprising:

a plurality of vias that selectively electrically connect the ground plane to respective ones of the plurality conductive patches.

15. An antenna, comprising:

a ground plane in a first layer of a printed circuit board;

a plurality of conductive patches in a second layer of the printed circuit board; and an antenna structure in a third layer of the printed circuit board and overlapping some of the plurality of conductive patches in the second layer of the printed circuit board, wherein the plurality of conductive patches in the second layer of the printed circuit board are separated from the antenna structure by a distance that is substantially less than a quarter wavelength of a resonant frequency of the antenna, and wherein a direction of a radiation pattern of the antenna is determined based on selectively electrically connecting ones of plurality of the conductive patches in the second layer of the printed circuit board to the ground plane or to adjacent ones of the plurality of conductive patches in the second layer of the printed circuit board.

16. The antenna of claim 15, wherein the ones of the plurality of conductive patches in the second layer of the printed circuit board are selectively electrically connected to adjacent ones of the plurality of conductive patches in the second layer of the printed circuit board.

17. The antenna of claim 15, further comprising:

a signal layer comprising a feedline, wherein the feedline is coupled to the antenna structure.

18. The antenna of claim 17, wherein the plurality of conductive patches in the second layer of the printed circuit board are separated from the antenna structure by a distance that is substantially less than a quarter wavelength of the resonant frequency of the antenna, and wherein the signal layer is separated from the antenna structure by a distance that is substantially less than a quarter wavelength of the resonant frequency of the antenna.

* * * * *